US012177548B2

(12) United States Patent
Song

(10) Patent No.: US 12,177,548 B2
(45) Date of Patent: Dec. 24, 2024

(54) HYPERSPECTRAL SENSOR, HYPERSPECTRAL IMAGING SYSTEM INCLUDING THE SENSOR, AND HYPERSPECTRAL IMAGING METHOD USING THE SYSTEM

(71) Applicant: ELECTRONICS AND TELECOMMUNICATIONS RESEARCH INSTITUTE, Daejeon (KR)

(72) Inventor: Jung-Ho Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 309 days.

(21) Appl. No.: 17/699,026

(22) Filed: Mar. 18, 2022

(65) Prior Publication Data
US 2022/0303440 A1    Sep. 22, 2022

(30) Foreign Application Priority Data

Mar. 22, 2021  (KR) .................. 10-2021-0036900
Feb. 3, 2022   (KR) .................. 10-2022-0014120

(51) Int. Cl.
*H04N 23/55*  (2023.01)
*G01J 3/02*   (2006.01)
(Continued)

(52) U.S. Cl.
CPC .......... *H04N 23/55* (2023.01); *G01J 3/0208* (2013.01); *G01J 3/0235* (2013.01); *G02B 27/646* (2013.01); *G01J 2003/2826* (2013.01)

(58) Field of Classification Search
CPC ...... H04N 23/55; G01J 3/0208; G01J 3/0235; G01J 2003/2826; G02B 27/646
(Continued)

(56) References Cited

U.S. PATENT DOCUMENTS 8,994,939 B2   3/2015   Herrala
9,185,291 B1   11/2015  Shabtay et al.
(Continued)

FOREIGN PATENT DOCUMENTS

KR   1020160032593 A   3/2016
KR     20200071563 A   6/2020
(Continued)

OTHER PUBLICATIONS

Rand C. Swanson et al., "Anamorphic imaging spectrometer", Proceedings of SPIE, 6940, Apr. 16, 2008, pp. 694010-1 ~ 694010-12.

*Primary Examiner* — Joel W Fosselman
(74) *Attorney, Agent, or Firm* — Rabin & Berdo, P.C.

(57) ABSTRACT

Provided are a hyperspectral sensor including a window, a first focusing part provided on a rear surface of the window and including a plurality of lenses, a first image sensor provided on a rear surface of the first focusing part and having a front surface parallel to the rear surface of the window, a first mirror spaced apart from the first focusing part and the first image sensor and having a front surface inclined with respect to the rear surface of the window, a first optical element spaced apart from the first mirror, a second optical element spaced apart from the first optical element and having a periodic refractive index distribution therein, a second focusing part spaced apart from the second optical element and including a plurality of lenses, and a second image sensor provided on a rear surface of the second focusing part, a hyperspectral imaging system including the hyperspectral sensor, and a hyperspectral imaging method using the hyperspectral imaging system.

18 Claims, 15 Drawing Sheets

(51) Int. Cl.
*G01J 3/28* (2006.01)
*G02B 27/64* (2006.01)

(58) Field of Classification Search
USPC .......................................... 348/335
See application file for complete search history.

(56) References Cited

U.S. PATENT DOCUMENTS

| | | |
|---|---|---|
| 9,435,689 B2 | 9/2016 | Comstock et al. |
| 9,448,114 B2 | 9/2016 | Goldring et al. |
| 9,568,712 B2 | 2/2017 | Dror et al. |
| 10,209,440 B2 | 2/2019 | Lee et al. |
| 10,437,022 B2 | 10/2019 | Yao et al. |
| 11,037,283 B2 | 6/2021 | Jang et al. |
| 2018/0088378 A1 | 3/2018 | Park et al. |
| 2019/0200848 A1 | 7/2019 | McDowall et al. |
| 2020/0257111 A1* | 8/2020 | Sinclair .............. G02B 27/0037 |
| 2021/0278275 A1 | 9/2021 | Song |
| 2021/0383151 A1 | 12/2021 | Germain |
| 2022/0283028 A1 | 9/2022 | Cho et al. |

FOREIGN PATENT DOCUMENTS

| | | |
|---|---|---|
| KR | 20210023602 A | 3/2021 |
| KR | 1020210112566 A | 9/2021 |

* cited by examiner

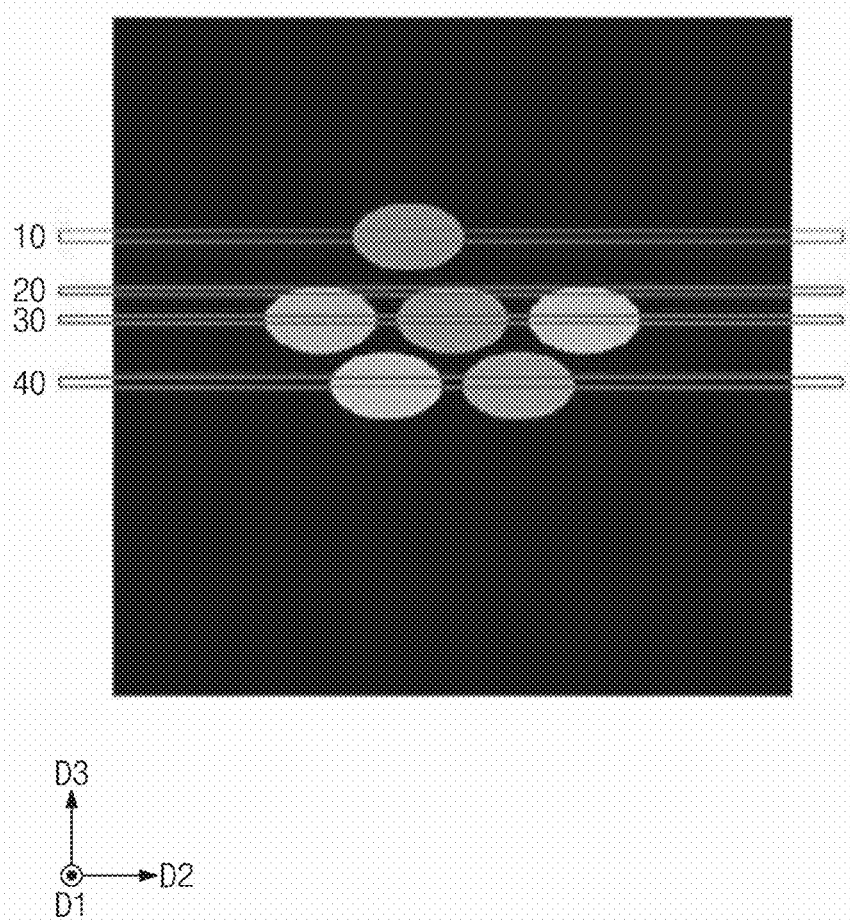

HYPERSPECTRAL SENSOR, HYPERSPECTRAL IMAGING SYSTEM INCLUDING THE SENSOR, AND HYPERSPECTRAL IMAGING METHOD USING THE SYSTEM

CROSS-REFERENCE TO RELATED APPLICATIONS

This U.S. non-provisional patent application claims priority under 35 U.S.C. § 119 of Korean Patent Application Nos. 10-2021-0036900, filed on Mar. 22, 2021, and 10-2022-0014120, filed on Feb. 3, 2022, the entire contents of which are hereby incorporated by reference.

BACKGROUND

The present disclosure relates to a hyperspectral sensor, and more particularly, to a hyperspectral sensor including a general camera optical system and a hyperspectral optical system, a hyperspectral imaging system including the same, and a hyperspectral imaging method for grasping a spectrum of an analysis target using the same.

To detect dangerous substances, the growth status of agricultural crops, and the prosperity of algae in lakes in a wide area, in addition to the spatial distribution, a hyperspectral sensor that may determine the spectroscopic characteristics of the object is used. These hyperspectral sensors are being mounted on manned aircraft and small unmanned aerial vehicles. When it is mounted on a small unmanned mobile vehicle, the range of application is very wide, so that research is underway to realize this.

In particular, when the hyperspectral sensor includes many components having focal lengths, the overall size of the sensor may be increased, and in order to correct the aberration occurring in each of the components having the focal length, the structure becomes complicated and manufacturing becomes difficult. Accordingly, many efforts are being made to reduce the size and weight of the hyperspectral sensor.

SUMMARY

The present disclosure provides a miniaturized, simplified hyperspectral sensor, a hyperspectral imaging system including the same, and a hyperspectral imaging method using the same.

An embodiment of the inventive concept provides a hyperspectral sensor including: a window; a first focusing part provided on a rear surface of the window and including a plurality of lenses; a first image sensor provided on a rear surface of the first focusing part and having a front surface parallel to the rear surface of the window; a first mirror spaced apart from the first focusing part and the first image sensor and having a front surface inclined with respect to the rear surface of the window; a first optical element spaced apart from the first mirror; a second optical element spaced apart from the first optical element and having a periodic refractive index distribution therein; a second focusing part spaced apart from the second optical element and including a plurality of lenses; and a second image sensor provided on a rear surface of the second focusing part.

In an embodiment, the first optical element may have a periodic refractive index distribution therein, wherein a thickness of the first optical element may be less than a thickness of the second optical element.

In an embodiment, the first optical element may be any one or a combination of two or more selected from surface diffraction grating, volume Bragg grating, or at least one or more prisms.

In an embodiment, the first mirror may be connected to an actuator, wherein the first mirror may be configured to be rotated by the actuator.

In an embodiment, the second optical element may be configured such that light diffracted by the second optical element travels in parallel with the rear surface of the window.

In an embodiment, the front surface of the first mirror may be a curved surface having a curvature.

In an embodiment, the hyperspectral sensor may further include a third optical element between the first mirror and the first optical element, wherein the third optical element may be a close-up lens or an achromatic lens.

In an embodiment, the hyperspectral sensor may further include a second mirror spaced apart from the second optical element and the second focusing part and having a front surface inclined with respect to the rear surface of the window, wherein the second image sensor may have a front surface parallel to the rear surface of the window.

In an embodiment, the second image sensor may extend in a direction perpendicular to the rear surface of the window.

In an embodiment, the hyperspectral sensor may further include a first shade adjacent to the front surface of the first mirror, and a second shade adjacent to a rear surface of the second optical element, wherein each of the first and second shades may be configured to remove a 0th-order diffracted light component that is not diffracted from the second optical element.

In an embodiment of the inventive concept, a hyperspectral imaging system includes: a hyperspectral sensor including a window, a first optical system configured to receive a first incident light, and a second optical system spaced apart from the first optical system and configured to receive a second incident light; an optical image stabilization (OIS) module configured to detect and control the movement of the hyperspectral sensor; and a processor connected to the first optical system and the second optical system of the hyperspectral sensor, and the OIS module, wherein the first optical system includes: a first focusing part provided on a rear surface of the window and configured to focus the first incident light; and a first image sensor provided on a rear surface of the first focusing part and configured to detect the first incident light passing through the first focusing part, wherein the second optical system includes: a first mirror having a front surface inclined with respect to the rear surface of the window and configured to reflect the second incident light; first and second optical elements spaced apart from the first mirror and configured to diffract the second incident light; a second focusing part spaced apart from the second optical element and configured to focus diffracted light diffracted by the second optical element; and a second image sensor provided on a rear surface of the second focusing part and configured to detect the diffracted light passing through the second focusing part.

In an embodiment, the first optical element may be any one or a combination of two or more selected from surface diffraction grating, volume Bragg grating, or at least one or more prisms, wherein the second optical element may be a volume Bragg grating.

In an embodiment, each of the first and second optical elements may be a volume Bragg grating, wherein a grating period of the first optical element may be different from a grating period of the second optical element.

In an embodiment, the OIS module may include position sensors and OIS actuators connected to the hyperspectral sensor, and an OIS controller connected to the position sensors and the OIS actuators, respectively, wherein the OIS controller may be configured to receive position information from the position sensors and transmit the position information to the OIS actuators.

In an embodiment, the hyperspectral imaging system may further include: a scan mirror controller connected to the first mirror of the second optical system; a focusing optics controller connected to the first focusing part of the first optical system and the second focusing part of the second optical system; and a light source controller connected to the processor, wherein the light source controller may include an LED driver connected to the processor, and an LED source connected to the LED driver and having a predetermined spectrum.

In an embodiment of the inventive concept, a hyperspectral imaging method using a hyperspectral sensor including a window configured such that first and second incident lights are incident, a first optical system configured such that the first incident light passing through the window is incident; and a second optical system spaced apart from the first optical system and configured such that the second incident light passing through the window is incident, the method including: setting a measurement area; taking a reference image by the first optical system; taking hyperspectral images by the second optical system; compositing the hyperspectral images; comparing the reference image with a composite image obtained by compositing the hyperspectral images; and outputting a measurement result, wherein the first optical system includes: a first focusing part provided on a rear surface of the window and configured to focus the first incident light; and a first image sensor provided on a rear surface of the first focusing part and configured to detect the first incident light passing through the first focusing part, wherein the second optical system includes: a first mirror having a front surface inclined with respect to the rear surface of the window and configured to reflect the second incident light; a spectral angle converting unit spaced apart from the first mirror and configured to convert the second incident light to travel at an angle that satisfies a Bragg condition for each wavelength; a volume Bragg grating spaced apart from the spectral angle converting unit and configured to diffract the angle-converted light by the spectral angle converting unit; a second focusing part spaced apart from the volume Bragg grating and configured to focus diffracted light diffracted by the volume Bragg grating; and a second image sensor provided on a rear surface of the second focusing part and configured to detect the diffracted light passing through the second focusing part.

In an embodiment, the taking of the hyperspectral images by the second optical system may include a plurality of photographing operations, wherein each of the photographing operations may include: rotating the first mirror; taking a hyperspectral image by the second image sensor; and correcting a distortion of the hyperspectral image.

In an embodiment, the taking of the hyperspectral image by the second image sensor may be performed once with light source on and may be performed once with light source off.

In an embodiment, the method may further include inputting a measurement mode before the setting of the measurement area, wherein the measurement mode may be any one selected from a point spectrum measurement mode, a spectrum measurement mode after shape recognition, a spatial low-resolution measurement mode, or a spatial high-resolution measurement mode.

In an embodiment, the spectral angle converting unit may be any one or a combination of two or more selected from surface diffraction grating, volume Bragg grating, or at least one or more prisms.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings:

FIG. 3D shows the optical path in the second cross-section;

FIGS. 7, 8A, 8B, 8C, and 8D are simulation results for explaining an image measured by a hyperspectral sensor according to embodiments of the inventive concept;

DETAILED DESCRIPTION

Figure 1:
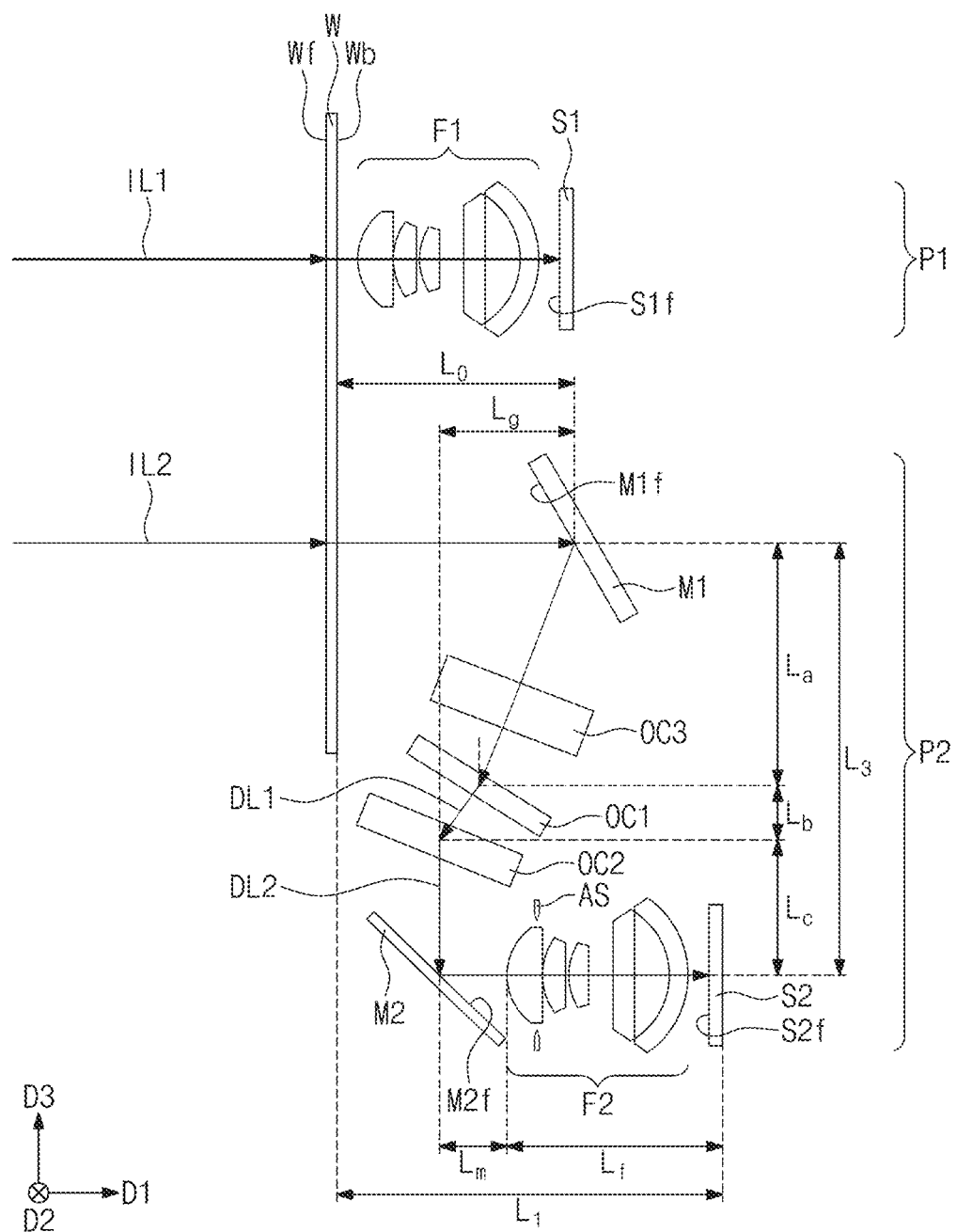
FIG. 1 is a conceptual diagram for explaining the structure of a hyperspectral sensor according to embodiments of the inventive concept.

In order to fully understand the configuration and effects of the inventive concept, preferred embodiments of the inventive concept will be described in detail with reference to the accompanying drawings.

The inventive concept is not limited to the embodiments disclosed below, but may be implemented in various forms, and various modifications and changes may be added. However, it is provided to completely disclose the technical idea of the inventive concept through the description of the present embodiments, and to fully inform a person of ordinary skill in the art to which the inventive concept belongs. In the accompanying drawings, the components are shown to be enlarged in size for convenience of description, and the ratio of each component may be exaggerated or reduced.

The terms used in this specification are for describing embodiments and are not intended to limit the inventive concept. In addition, terms used in the present specification may be interpreted as meanings commonly known to those of ordinary skill in the art, unless otherwise defined.

In this specification, the singular form also includes the plural form unless specifically stated in the phrase. As used in the specification, in relation to 'comprises' and/or 'comprising', the mentioned elements, steps, operations and/or elements do not exclude the presence or addition of one or more other elements, steps, operations and/or elements.

In the case where a layer is referred to herein as being 'on' another layer, it may be formed directly on the upper surface of the other layer or a third layer may be interposed therebetween.

In the present specification, terms such as first and second are used to describe various regions, layers, and the like, but these regions and layers should not be limited by these terms. These terms are only used to distinguish one region or layer from another region or layer. Accordingly, a portion referred to as a first portion in one embodiment may be referred to as a second portion in another embodiment. The embodiments described and illustrated herein also include complementary embodiments thereof. Like reference numerals refer to like elements throughout the specification.

Hereinafter, a hyperspectral sensor, a hyperspectral imaging system including the same, and a hyperspectral imaging method using the same according to embodiments of the inventive concept will be described in detail with reference to the drawings.

Figure 2:
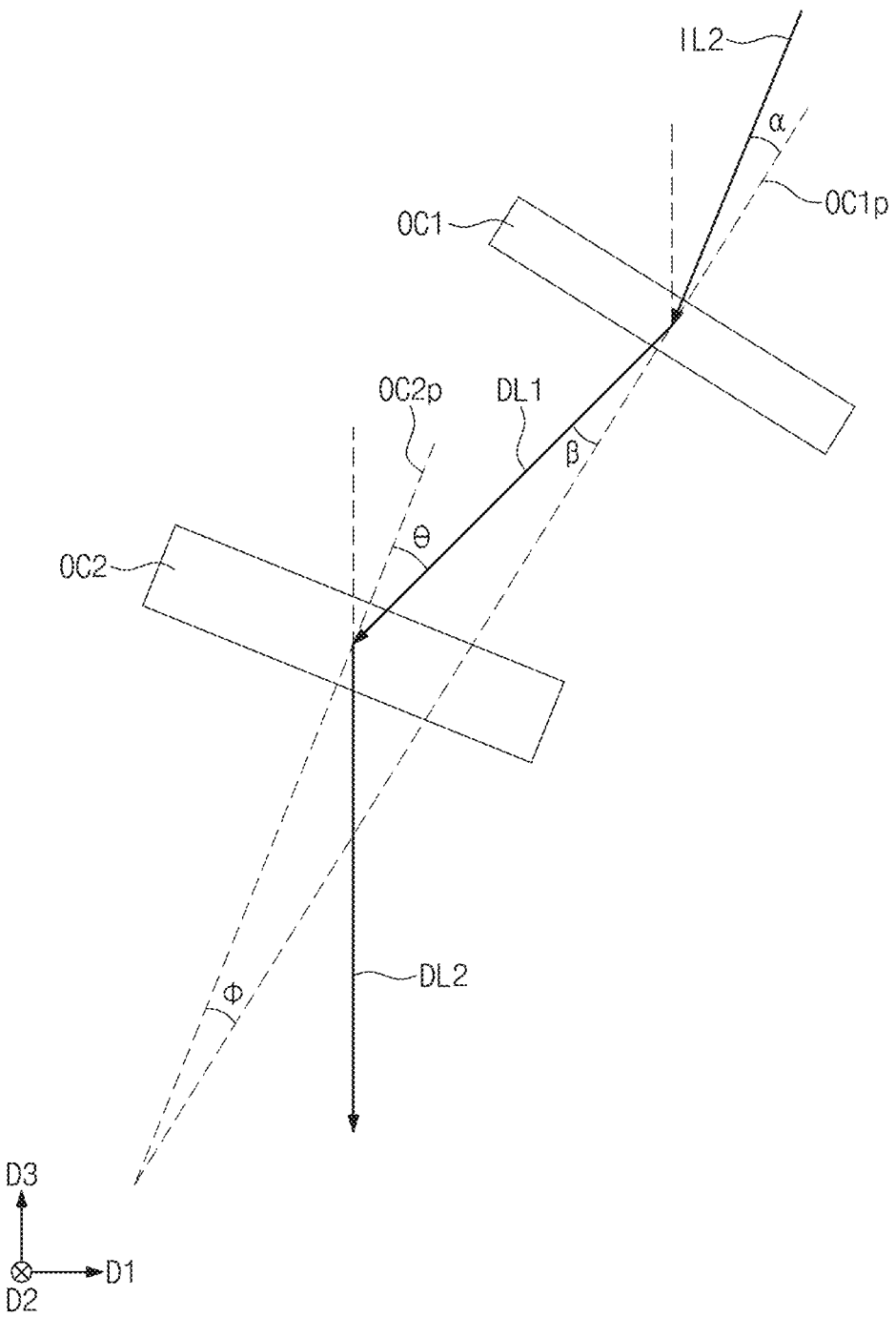
FIG. 2 is an enlarged view for explaining a first optical element and a second optical element of the hyperspectral sensor according to FIG. 1.

FIG. 1 is a conceptual diagram for explaining the structure of a hyperspectral sensor according to embodiments of the inventive concept. FIG. 2 is an enlarged view for explaining a first optical element and a second optical element of the hyperspectral sensor according to FIG. 1.

Referring to FIG. 1, the hyperspectral sensor according to the inventive concept may include a window W, a first optical system P1 and a second optical system P2. The first optical system P1 and the second optical system P2 may be spaced apart from each other. The first optical system P1 may include a first focusing part F1 and a first image sensor S1. The second optical system P2 may include a first mirror M1, a first optical element OC1, a second optical element OC2, a second focusing part F2, and a second image sensor S2. The first incident light IL1 may be incident toward the first optical system P1, and the second incident light IL2 may be incident toward the second optical system P2. The first optical system P1 may be the same as the optical system of a general camera, and the second optical system P2 may be a hyperspectral optical system (hyperspectral optics). Hereinafter, each of the first and second optical systems P1 and P2 will be described in detail.

The window W may have a planar shape that is perpendicular to the first direction D1 and extends in the second direction D2 and the third direction D3. The first to third directions D1, D2, and D3 may be directions orthogonal to each other. The first and second incident lights IL1 and IL2 may be incident parallel to the first direction D1 toward the window W, but this is merely exemplary and the inventive concept is not limited thereto, and the first and second incident lights IL1 and IL2 may be incident from different directions intersecting the front surface Wf of the window W. In other words, the front surface Wf of the window W may face the analysis target, and may receive the first and second incident lights IL1 and IL2 emitted from the analysis target. The window W may protect the first and second optical systems P1 and P2 on the rear surface Wb from external impact and/or contamination.

In this specification, the front surface is defined as a surface facing the light incident toward each component, and the rear surface is defined as a surface that emits light passing through each component. For example, the front surface may be a surface facing the direction opposite to the first direction D1, and the rear surface may be a surface facing the first direction D1.

The first focusing part F1 may be provided on the rear surface Wb of the window W. The first focusing part F1 may be provided between the window W and the first image sensor S1. The first focusing part F1 may be configured to focus the first incident light IL1 passing through the window W. The first focusing part F1 may include a plurality of lenses. A central axis of each of the plurality of lenses of the first focusing part F1 may coincide with a central axis of the first image sensor S1. A central axis of each of the plurality of lenses of the first focusing part F1 may be parallel to the first direction D1, for example. The plurality of lenses of the first focusing part F1 are not limited to the illustrated shape and the illustrated curvature of the side surface, but may have various shapes and curvatures.

The first image sensor S1 may be provided on the rear surface of the first focusing part F1. The first image sensor S1 may have a front surface S1$f$ parallel to the rear surface Wb of the window W. The first image sensor S1 may be configured to detect the first incident light IL1 passing through the window W and the first focusing part F1. The first image sensor S1 may be disposed such that its front surface S1$f$ coincides with a focal plane of the first incident light IL1.

The first mirror M1 may be provided at a position spaced apart from the first focusing part F1 and the first image sensor S1 in the third direction D3. The first mirror M1 may be spaced apart from the rear surface Wb of the window W in the first direction D1. The first mirror M1 may have a front surface M1$f$ inclined with respect to the rear surface Wb of the window W (i.e., with respect to the third direction D3). An angle between the front surface MY of the first mirror M1 and the rear surface Wb of the window W may be greater than 0 degrees and less than 90 degrees. A central axis of the first mirror M1 may be connected to the actuator. The first mirror M1 may be configured to rotate clockwise or counterclockwise by the actuator. The first mirror M1 may be configured to reflect the second incident light IL2 traveling from the first incident light IL1 in a path shifted in the third direction D3.

The first and second optical elements OC1 and OC2 may be provided at positions spaced apart from the first mirror M1 in the third direction D3. The first optical element OC1 may be provided between the first mirror M1 and the second optical element OC2 in the third direction D3, and the second optical element OC2 may be provided between the first optical element OC1 and the second focusing part F2 in the third direction D3. The first and second optical elements OC1 and OC2 may be spaced apart from the rear surface Wb of the window W in the first direction D1. The first and second optical elements OC1 and OC2 may overlap each other in the first direction D1, but this is merely exemplary and the inventive concept is not limited thereto.

The first optical element OC1 may convert the second incident light IL2 to travel at an angle satisfying the Bragg condition for each wavelength. In other words, the degree of changing the propagation angle of the second incident light IL2 according to the wavelength of the first optical element OC1 may be different. In this specification, the first optical element OC1 may be referred to as a spectral angle converting unit.

The first optical element OC1 may be, for example, a surface diffraction grating including periodic protrusions on a surface. As another example, the first optical element OC1 may be a volume Bragg grating having a periodic refractive index distribution therein. The volume Bragg grating may be referred to as a bulk Bragg grating or a volume holographic grating. The first optical element OC1 may be, for example, a prism.

The first optical element OC1 may be, for example, any one selected from surface diffraction grating, volume Bragg grating, or at least one or more prisms or a combination of two or more selected from surface diffraction grating, volume Bragg grating, or at least one or more prisms. When the first optical element OC1 includes a diffraction grating and at least one prism, the at least one prism may be provided between the diffraction grating and a second optical element OC2 to be described later.

The second optical element OC2 may be, for example, a volume Bragg grating having a periodic refractive index distribution therein. The second optical element OC2 may be spaced apart from the first optical element OC1.

When each of the first and second optical elements OC1 and OC2 is a volume Bragg grating, a thickness of the second optical element OC2 may be different from a thickness of the first optical element OC1. For example, the thickness of the second optical element OC2 may be greater than the thickness of the first optical element OC1. Each of the first and second optical elements OC1 and OC2 may include a support portion and a grating portion (i.e., an inner portion in which the refractive index changes periodically), and the thickness of each of the first and second optical elements OC1 and OC2 means the thickness of only the grating portion excluding the thickness of the support portion. In volume Bragg grating, as the difference in refractive index (i.e., the difference in refractive index between the high refractive index part and the low refractive index part) becomes smaller and the thickness of the grating increases, angular selectivity may be increased.

When each of the first and second optical elements OC1 and OC2 is a volume Bragg grating, the grating period $\Lambda1$ of the first optical element OC1 may be different from the grating period $\Lambda2$ of the second optical element OC2. For example, the grating period $\Lambda1$ of the first optical element OC1 may be greater than the grating period $\Lambda2$ of the second optical element OC2. The grating period $\Lambda1$ of the first optical element OC1 and the grating period $\Lambda2$ of the second optical element OC2 may satisfy the following [Equation 1], and accordingly, a wavelength dependent aiming angle error for each wavelength with respect to the reference wavelength $\lambda$, of the second incident light IL2 may be minimized. The wavelength dependent aiming angle error means an angle deviating from the reference angle when light having a reference wavelength and incident at a reference angle meets the Bragg condition, and when light incident at an angle deviating from the reference angle for each wavelength meets the Bragg condition.

$$\Lambda_1 = \Lambda_2 \sqrt{4 - 3\left(\frac{\lambda}{2\Lambda_2}\right)^2} \qquad \text{[Equation 1]}$$

For example, in order to satisfy [Equation 1], if the reference wavelength $\lambda$ is about 620 nm, and the grating period $\Lambda2$ of the second optical element OC2 is about 0.833 µm (i.e., the grating density is about 1200 lines/mm), the grating period $\Lambda1$ of the first optical element OC1 is about 1.578 µm (i.e., the grating density is about 633.8 lines/mm). When the wavelength is about 400 nm, the wavelength dependent aiming angle error is about 0.11 degrees, and when the wavelength is about 800 nm, the wavelength dependent aiming angle error is about 0.08 degrees.

For example, when a first light having a wavelength of about 620 nm and incident at a reference angle and a second light having a wavelength of about 550 nm and incident at an angle deviating from the reference angle are diffracted in the first optical element OC1 and the second optical element OC2, although the first and second lights have different wavelengths, they may be detected at the same position on the front surface S2f of the second image sensor S2. When the second optical element OC2 has a large angular selectivity, the first light is diffracted by the second optical element OC2 by satisfying the Bragg condition, but the second light does not satisfy the Bragg condition and is not diffracted from the second optical element OC2 and travels straight, and is not detected on the front surface S2f of the second image sensor S2, so that accordingly, the second optical system P2 may operate as a hyperspectral optical system (hyperspectral optics).

When the first optical element OC1 is a surface diffraction grating and the second optical element OC2 is a volume Bragg grating, the second optical element OC2 may be provided in parallel with the first optical element OC1. When the first and second optical elements OC1 and OC2 are provided in parallel with each other, the grating period $\Lambda1$ of the first optical element OC1 may be twice the grating period $\Lambda2$ of the second optical element OC2.

Referring to FIG. 2, the first optical element OC1 may be configured to diffract the second incident light IL2 into a first diffracted light DL1, and the second optical element OC2 may be configured to diffract the first diffracted light DL1 into the second diffracted light DL2. In this case, each of the first and second optical elements OC1 and OC2 may be a diffraction grating having a grating period, and in particular, the second optical element OC2 may be a volume Bragg grating.

Specifically, the first optical element OC1 may diffract the second incident light IL2 into the first diffracted light DL1 according to a grating equation expressed by [Equation 2] below.

$$m\lambda = \Lambda_1(\sin\alpha + \sin\beta) \qquad \text{[Equation 2]}$$

In this case, m is the diffraction order, $\lambda$ is the wavelength of the second incident light IL2, $\Lambda1$ is the grating period of the first optical element OC1, $\alpha$ is an angle formed by a perpendicular line OC1p of the surface of the first optical element OC1 and the second incident light IL2, and $\beta$ is an angle between the first diffracted light DL1 and the perpendicular OC1p of the surface of the first optical element OC1. When $\alpha$ and $\beta$ are equal, the Bragg condition is satisfied and the diffraction efficiency of the first optical element OC1 is maximized.

In addition, the second optical element OC2 satisfies the Bragg condition, and the first diffracted light DL1 may be diffracted into the second diffracted light DL2 according to the grating equation expressed by Equation 3 below.

$$m\lambda = 2\Lambda_2 \sin\theta \qquad \text{[Equation 3]}$$

In this case, $\Lambda2$ is the grating period of the second optical element OC2, and $\theta$ is the angle formed by the perpendicular line OC2p of the surface of the second optical element OC2 and the first diffracted light DL1.

The second optical element OC2 may be configured such that the second diffracted light DL2 travels in parallel with the third direction D3. More specifically, the angle between the perpendicular line OC2p of the surface of the second optical element OC2 and the third direction D3 may be substantially equal to an angle $\theta$ formed between a perpendicular line OC2p of a surface of the second optical element OC2 and the first diffracted light DL1.

The second optical element OC2 may have a surface inclined with respect to the surface of the first optical element OC1. An angle φ at which the surface of the second optical element OC2 is inclined with respect to the surface of the first optical element OC1 is θ-β. For example, when the reference wavelength λ is about 620 nm, the grating period Λ2 of the second optical element OC2 is about 0.833 μm (i.e., the grating density is about 1200 lines/mm), the grating period Λ1 of the first optical element OC1 is about 1.578 μm (i.e., the grating density is about 633.8 lines/mm), θ is about 21.839 degrees, β is about 11.331 degrees, and φ is about 10.508 degrees.

Referring back to FIG. 1, the hyperspectral sensor according to the inventive concept may further include a third optical element OC3 provided between the first mirror M1 and the first optical element OC1 in the third direction D3. The third optical element OC3 may be configured to collimate the second incident light IL2 reflected from the first mirror M1 and directed toward the first optical element OC1. The third optical element OC3 may be a close-up lens or an achromatic lens that reduces aberration according to wavelength.

When the third optical element OC3 is an achromatic lens, the third optical element OC3 may include a first achromatic lens and a second achromatic lens bonded to each other and having different optical characteristics and/or different structures. Each of the first and second achromatic lenses may include glass or plastic. An $N_d/V_d$ value (i.e., (d-line refractive index)/(Abbe number)) of the first achromatic lens may be different from an $N_d/V_d$ value of the second achromatic lens. For example, the $N_d/V_d$ value of the first achromatic lens is about 1.805/25.36, and the $N_d/V_d$ value of the second achromatic lens is about 1.651/55.89. The front surface of the first achromatic lens, the rear surface of the first achromatic lens (i.e., the front surface of the second achromatic lens), and the rear surface of the second achromatic lens may have different radii of curvature. In one example, the radius of curvature of the front surface of the first achromatic lens is infinite (i.e., the front surface of the first achromatic lens is planar), the radius of curvature of the rear surface of the first achromatic lens is about −285.815 mm, and the radius of curvature of the rear surface of the second achromatic lens is about 167.715 mm. The thickness of the first achromatic lens may be substantially the same as the thickness of the second achromatic lens, but this is illustrative only, and the inventive concept is not limited thereto. For example, each of the first and second achromatic lenses may have a thickness of about 0.1 mm to about 1 mm.

The second focusing part F2 may be provided at a position spaced apart from the second optical element OC2 in the third direction D3. The second focusing part F2 may be spaced apart from the rear surface Wb of the window W in the first direction D1. The distance in the first direction D1 between the front surface of the second focusing part F2 and the rear surface Wb of the window W, for example, may be greater than the distance in the first direction D1 between the front surface of the first focusing part F1 and the rear surface Wb of the window W. The second focusing part F2 may be configured to focus the second diffracted light DL2 diffracted by the second optical element OC2. The second focusing part F2 may include a plurality of lenses. A central axis of each of the plurality of lenses of the second focusing part F2 may coincide with a central axis of the second image sensor S2. A central axis of each of the plurality of lenses of the second focusing part F2 may be parallel to the first direction D1, for example. The plurality of lenses of the second focusing part F2 are not limited to the illustrated shape and the illustrated curvature of the side surface, but may have various shapes and curvatures.

The second image sensor S2 may be provided on the rear surface of the second focusing part F2. The second image sensor S2 may have a front surface S2f parallel to the rear surface Wb of the window W. The second image sensor S2 may be configured to detect the second diffracted light DL2 that has passed through the second focusing part F2. The second image sensor S2 may be disposed such that its front surface S2f coincides with a focal plane of the second diffracted light DL2.

The hyperspectral sensor according to the inventive concept may further include a second mirror M2 spaced apart from the second optical element OC2 in the third direction D3 and spaced apart from the second focusing part F2 in the first direction D1. The second mirror M2 may have a front surface M2f inclined with respect to the rear surface Wb of the window W (i.e., with respect to the third direction D3). An angle between the front surface M2f of the second mirror M2 and the rear surface Wb of the window W may be, for example, about 45 degrees, and the angle may be fixed. The second mirror M2 may be configured to reflect the second deflected light DL2 to advance to the second focusing part F2.

The hyperspectral sensor according to the inventive concept may further include an aperture stop AS overlapping any one of the plurality of lenses of the second focusing part F2. For example, the aperture stop AS may overlap the one closest to the second optical element OC2 among the plurality of lenses of the second focusing part F2.

The length L3 of the second optical system P2 in the third direction D3 may be expressed by the following [Equation 4]. The length L3 of the second optical system P2 in the third direction D3 may be, for example, about 10 mm to about 15 mm.

$$L_3 = L_a + L_b + L_c \qquad \text{[Equation 4]}$$

In this case, $L_a$ is the distance in the third direction D3 between the center of the front surface M1f of the first mirror M1 and the center of the first optical element OC1, $L_b$ is the distance in the third direction (D3) between the center of the first optical element OC1 and the center of the second optical element OC2, and $L_c$ is a distance in the third direction D3 between the center of the second optical element OC2 and the center of the front surface M2f of the second mirror M2.

The length $L_1$ of the second optical system P2 in the first direction D1 may be expressed by the following [Equation 5]. The length $L_1$ of the second optical system P2 in the first direction D1 may be, for example, about 5 mm to about 15 mm.

$$L_1 = L_0 - L_g + L_m + L_f \qquad \text{[Equation 5]}$$

In this case, $L_0$ is the distance in the first direction D1 between the center of the rear surface Wb of the window W and the front surface M1f of the first mirror M1, $L_g$ is the distance in the first direction D1 between the center of the front surface M1f of the first mirror M1 and the center of the front surface M2f of the second mirror M2, $L_m$ is the distance in the first direction D1 between the center of the front surface M2f of the second mirror M2 and the front surface of the second focusing part F2, and $L_f$ is a distance in the first direction D1 between the front surface of the second focusing part F2 and the rear surface of the second image sensor S2.

The distance $L_g$ in the first direction D1 between the center of the front surface MY of the first mirror M1 and the center of the front surface M2f of the second mirror M2 may be expressed by the following [Equation 6]. The distance $L_g$ in the first direction D1 between the center of the front surface MY of the first mirror M1 and the center of the front surface M2f of the second mirror M2 may be, for example, about 2 mm to about 6 mm.

$$L_g L_a \tan 2\varphi + L_b \tan 2\theta \qquad \text{[Equation 6]}$$

In this case, $2\varphi$ is an angle at which the path of the second incident light IL2 reflected from the first mirror M1 is inclined with respect to the third direction D3, and $2\theta$ is an angle at which the path of the first diffracted light DL1 is inclined with respect to the third direction D3.

Meanwhile, the length of the second optical system P2 in the second direction D2 may be the same as the length of the first mirror M1 in the second direction D2. A length of the second optical system P2 in the second direction D2 may be determined by a viewing angle in the second direction D2. A length of the second optical system P2 in the second direction D2 may be, for example, about 5 mm to about 15 mm.

Figure 3A:
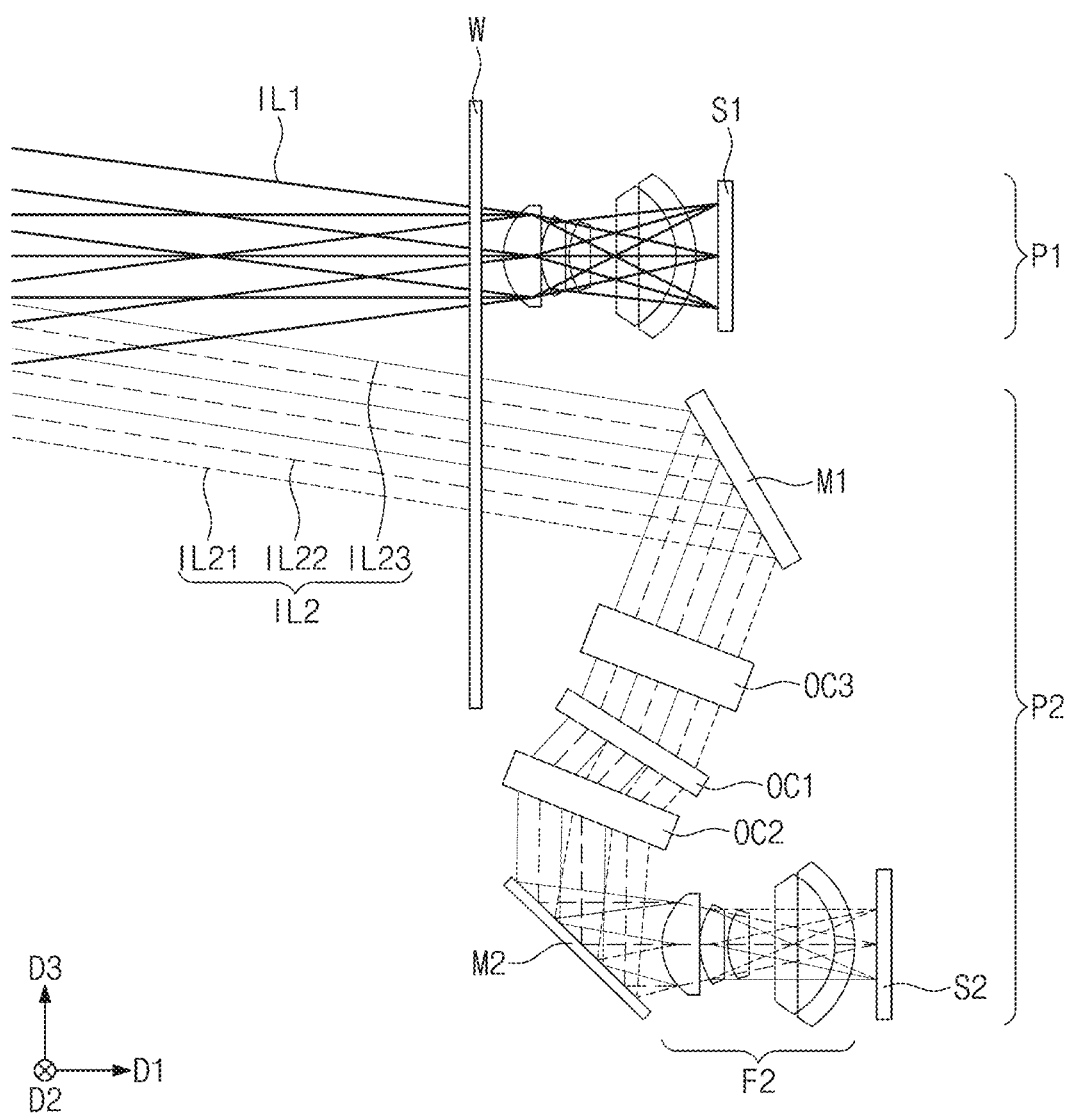
FIGS. 3A, 3B, 3C, and 3D are conceptual views illustrating a path of light incident to a hyperspectral sensor according to embodiments of the inventive concept.
Figure 3B:
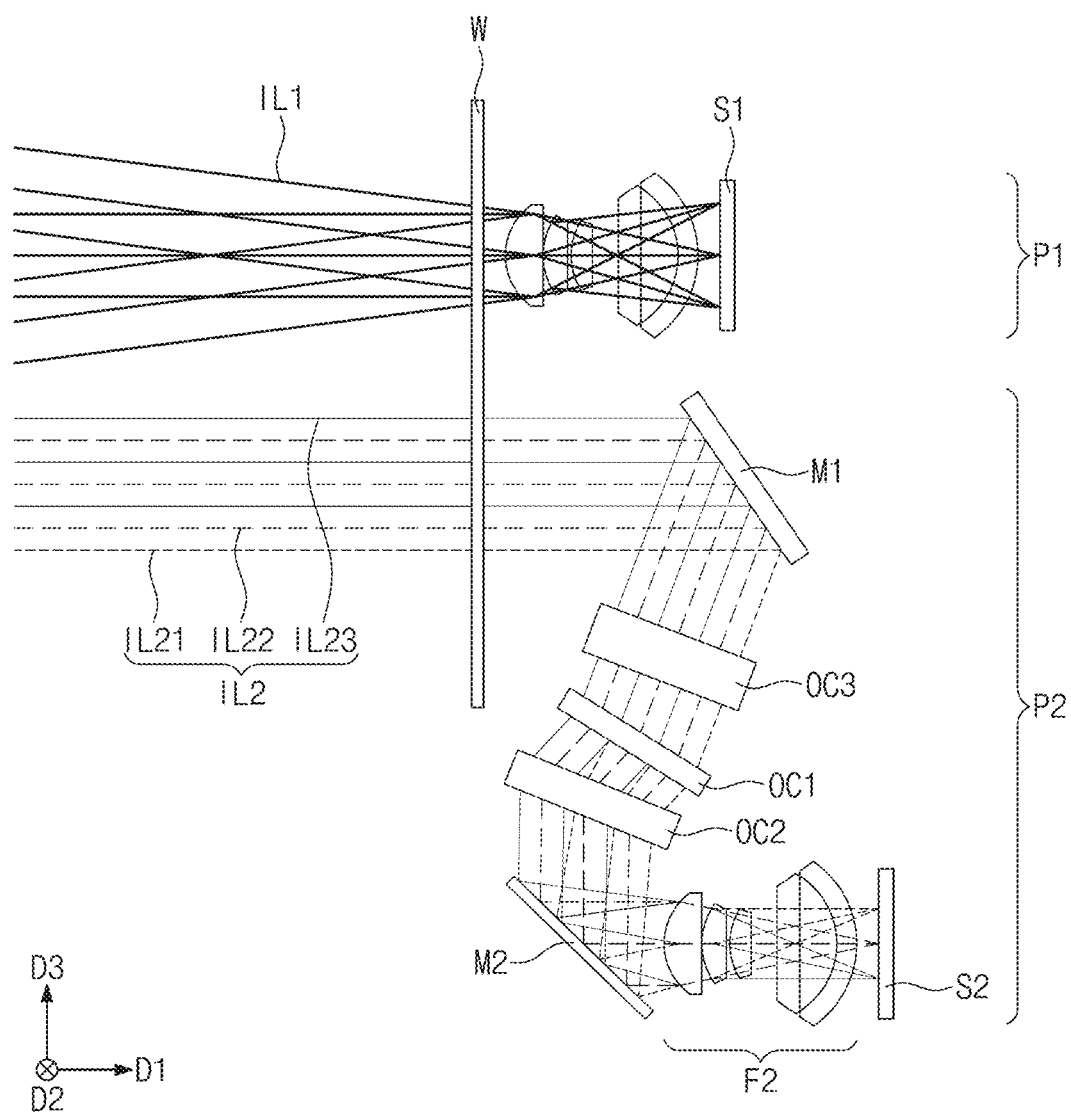
Figure 3C:
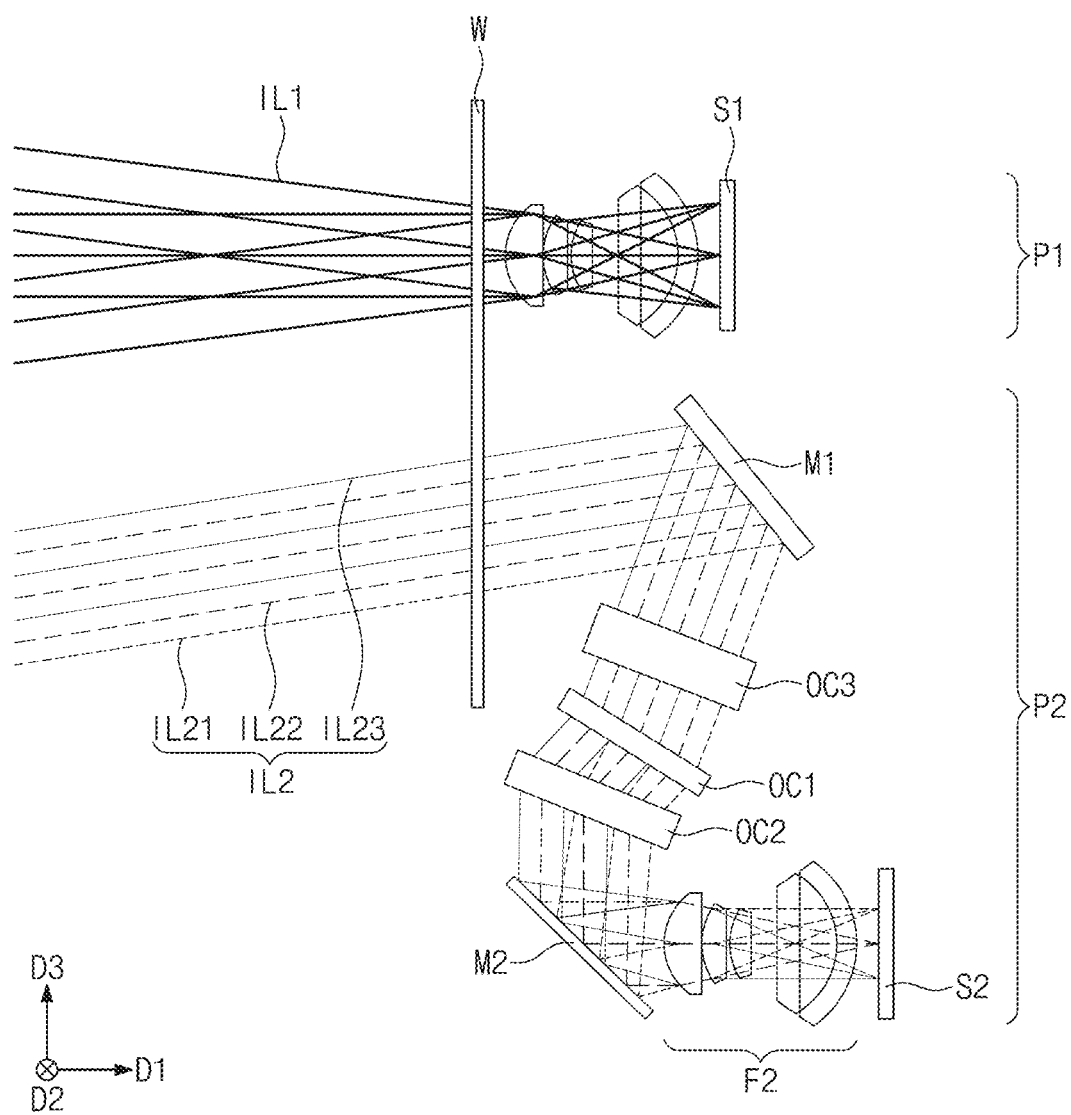
Figure 3D:
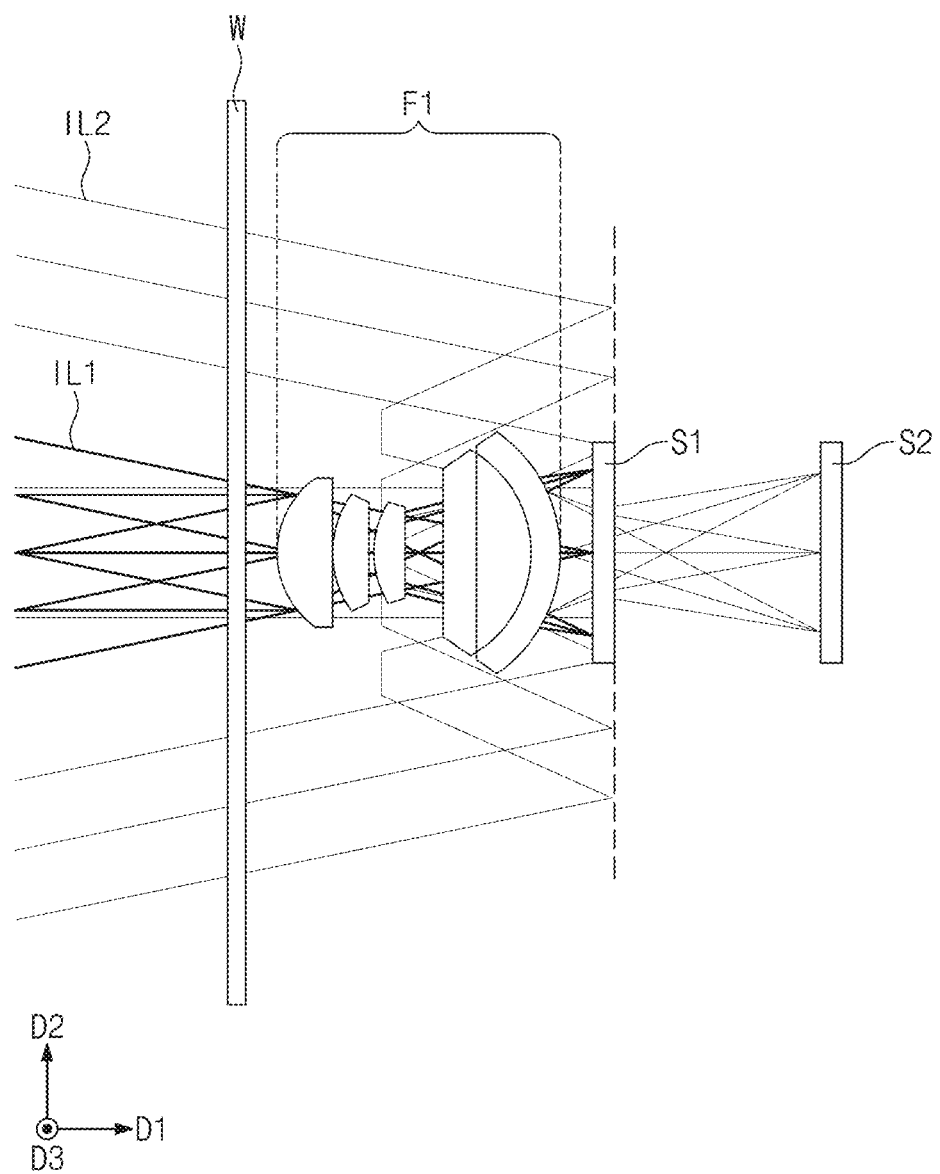

FIGS. 3A, 3B, 3C and 3D are conceptual diagrams illustrating a path of light incident to a hyperspectral sensor according to embodiments of the inventive concept, and FIGS. 3A, 3B, and 3C each show an optical path in a first cross-section, and FIG. 3D shows an optical path in a second cross-section.

FIGS. 3A, 3B and 3C show paths of a first incident light IL1 and a second incident light IL2 emitted from sources having the same position in the first direction D1 and the second direction D2 but different positions in the third direction D3. In the first optical system P1, the first incident light IL1 incident from different directions may form an image at different positions of the first image sensor S1 according to the incident direction regardless of wavelength. On the other hand, in the second optical system P2, the second incident light IL2 incident from any one direction may include first to third lights IL21, IL22, and IL23 having different wavelengths, and the first to third lights IL21, IL22, and IL23 may form images at different positions of the second image sensor S2 according to wavelengths. For example, the first light IL21 may have a shorter wavelength than the second light IL22, and the second light IL22 may have a shorter wavelength than the third light IL23.

The angle at which the first mirror M1 is inclined in FIGS. 3A, 3B, and 3C may be different from each other. The first mirror M1 may scan the entire area of the source extending in the third direction D3 by rotating it counterclockwise (or clockwise).

FIG. 3D shows a first incident light IL1 and a second incident light IL2 emitted from sources having the same position in the first direction D1 and the third direction D3 but different positions in the second direction D2. In the first optical system P1, the first incident light IL1 incident from different directions may form an image at different positions of the first image sensor S1 according to the incident direction regardless of wavelength. In the second optical system P2, the second incident light IL2 incident from different directions may form an image at different positions of the second image sensor S2 according to the incident direction regardless of wavelength.

Figure 4:
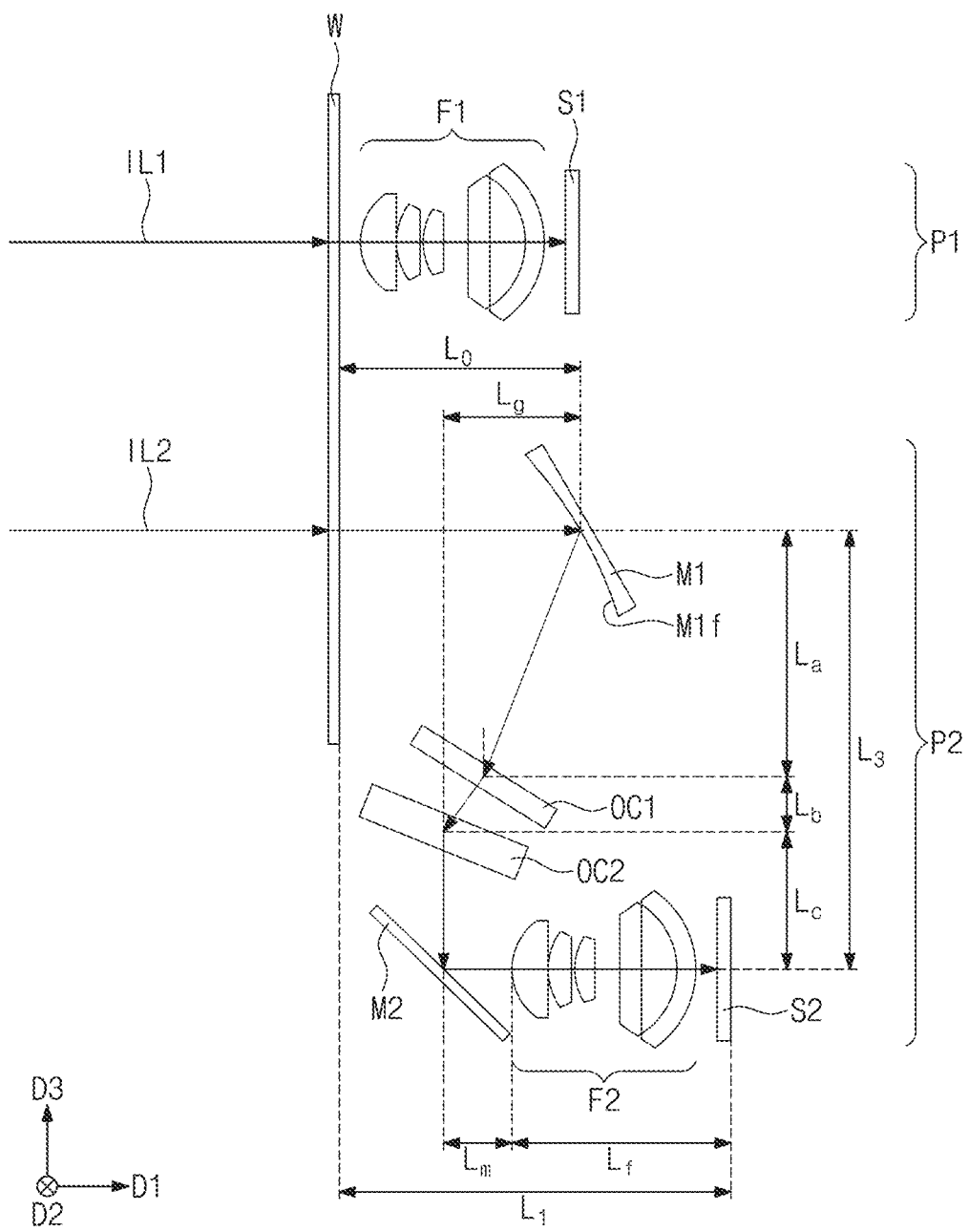
FIGS. 4, 5, and 6 are conceptual diagrams for explaining the structure of a hyperspectral sensor according to other embodiments of the inventive concept.
Figure 5:
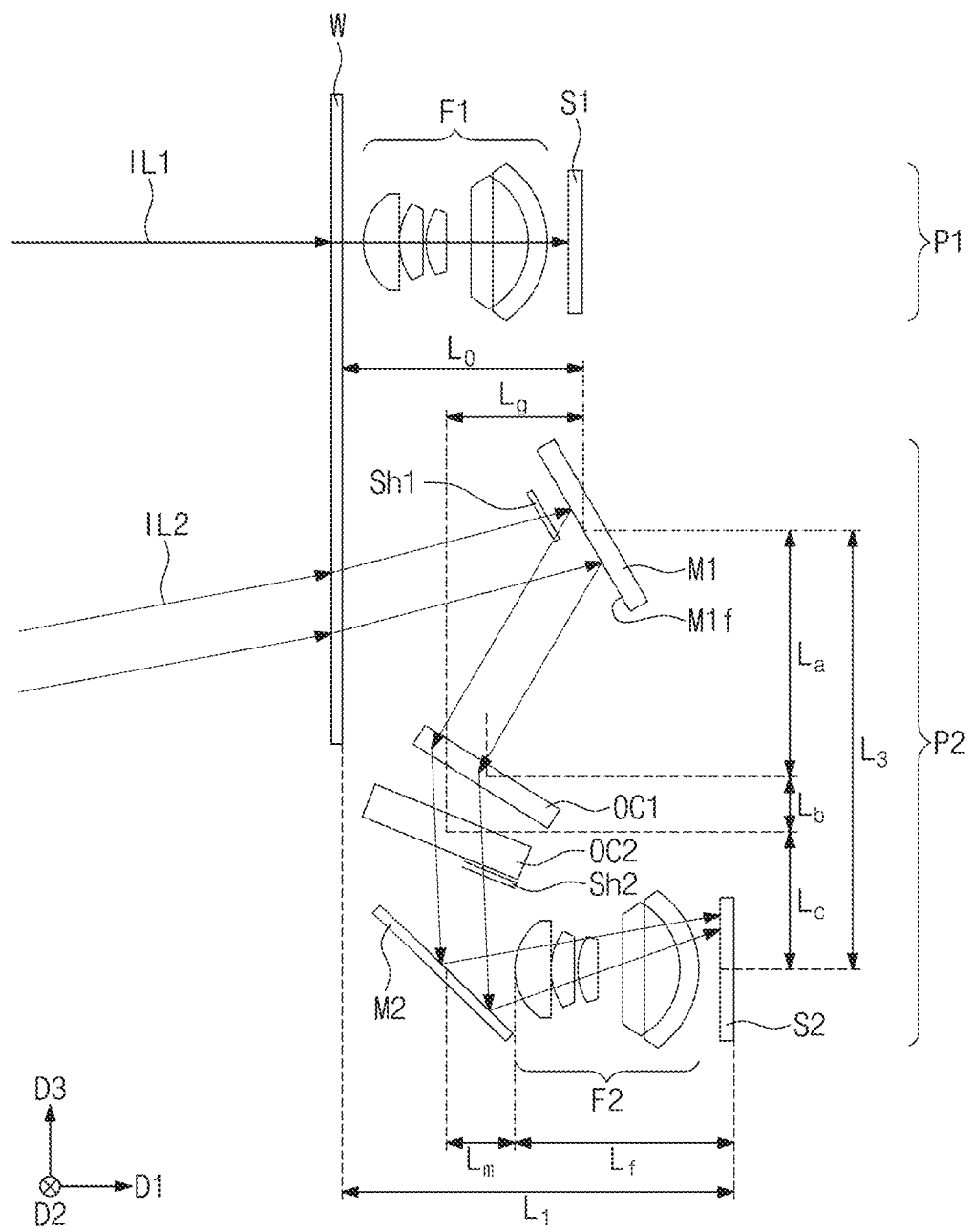
Figure 6:
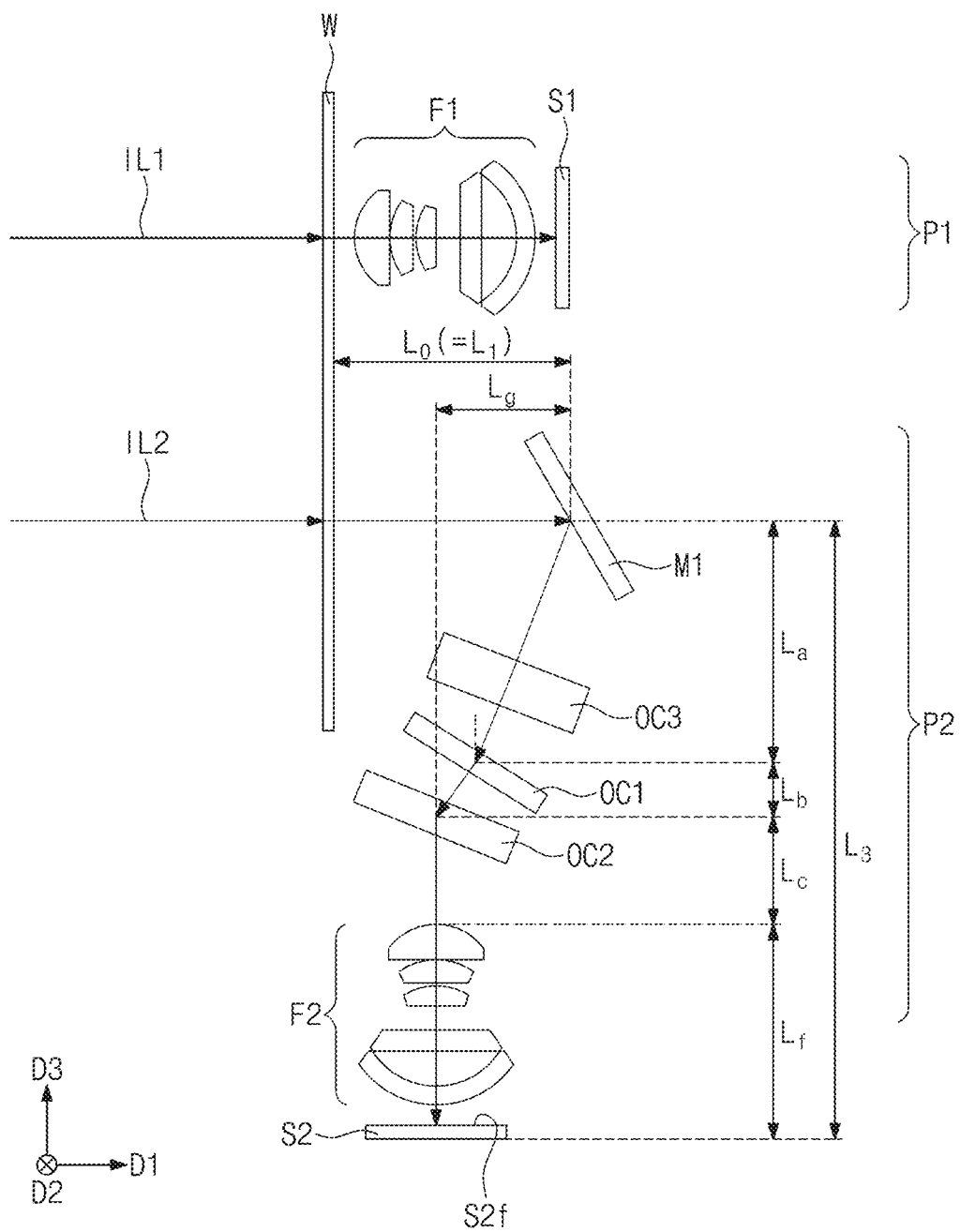
Figure 8A:
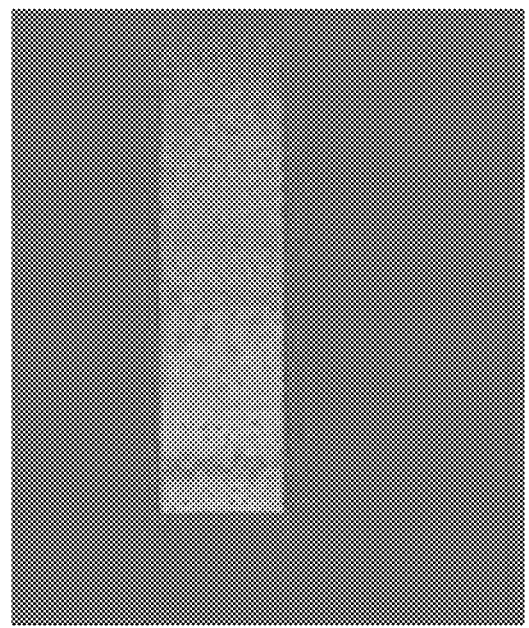
Figure 8B:
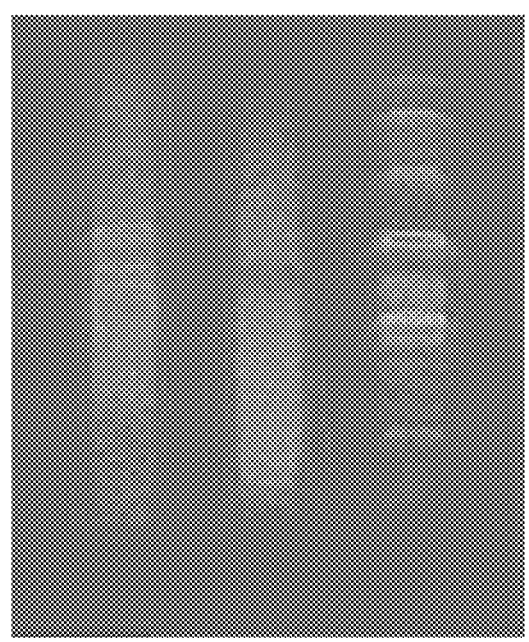
Figure 8C:
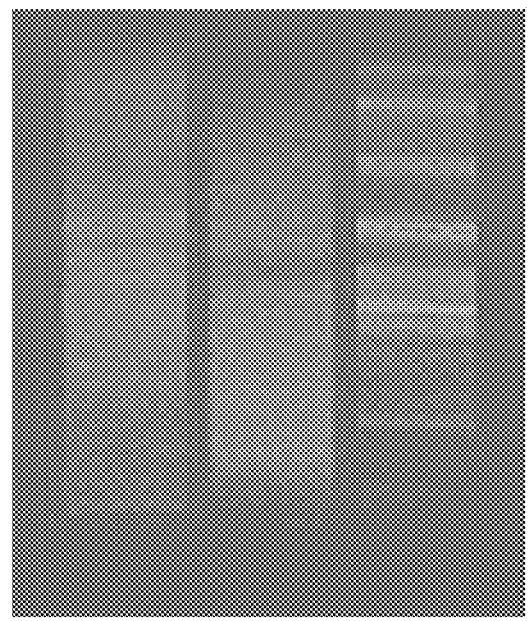
Figure 8D:
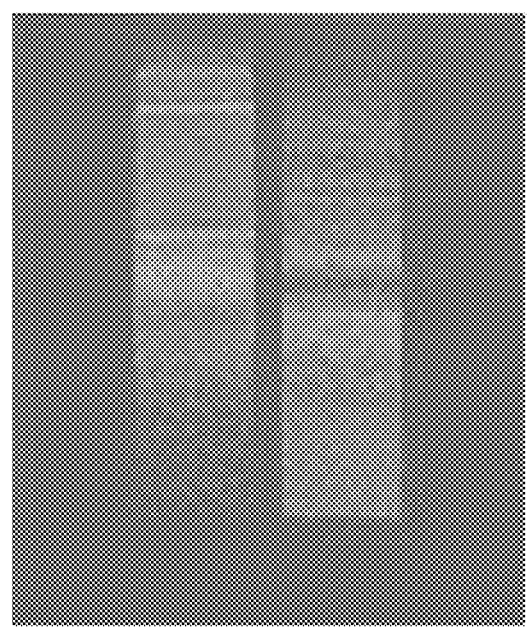

FIGS. 4, 5, and 6 are conceptual diagrams for explaining the structure of a hyperspectral sensor according to other embodiments of the inventive concept. Hereinafter, for convenience of description, descriptions of the items substantially the same as those described with reference to FIGS. 1 and 2 will be omitted and differences will be described in detail.

Referring to FIG. 4, the third optical element OC3 described with reference to FIG. 1 may be omitted. That is, the second incident light IL2 reflected from the front surface M1f of the first mirror M1 may travel to the first and second optical elements OC1 and OC2 without passing through a separate collimating optical system. A front surface M1f of the first mirror M1 may be a curved surface having a curvature, and a rear surface of the first mirror M1 may be a flat surface. The focal length of the first mirror M1 may be, for example, about 200 mm to about 400 mm.

According to embodiments, the first mirror M1 may be a reflective grating in which a grating having a period is engraved on the front surface M1f. According to embodiments, the front surface M1f of the first mirror M1 may be a flat surface, and the rear surface of the first mirror M1 may be a curved surface having a curvature. The first mirror M1 may be configured to rotate clockwise or counterclockwise by the actuator, and the surface on which the second incident light IL2 is reflected may be changed from the front surface M1f to the rear surface (or from the rear surface to the front surface M1f).

Referring to FIG. 5, the hyperspectral sensor according to the inventive concept may include any one of a first shade Sh1 and a second shade Sh2.

The first shade Sh1 may be provided on the front surface M1f of the first mirror M1. The first shade Sh1 may be configured to rotate together with the first mirror M1, for example. The second shade Sh2 may be provided between the second optical element OC2 and the second mirror M2. The second shade Sh2 may be provided on the rear surface of the second optical element OC2 or on the front surface of the second mirror M2. Each of the first shade Sh1 and the second shade Sh2 may block a portion of the second incident light IL2 to remove a 0th-order diffracted light component that is not diffracted from the second optical element OC2. For example, each of the first shade Sh1 and the second shade Sh2 may absorb or scatter a portion of the second incident light IL2. Accordingly, the image detected by the second image sensor S2 may become clearer.

Referring to FIG. 6, the second mirror M2 described with reference to FIG. 1 may be omitted. In this case, the second focusing part F2 and the second image sensor S2 may be arranged along the third direction D3. That is, the second diffracted light DL2 diffracted by the second optical element OC2 may travel in parallel with the third direction D3, pass through the second focusing part F2, and reach the second image sensor S2. The front surface S2f of the second image sensor S2 may extend in a direction perpendicular to the rear surface Wb of the window W (i.e., the first direction D1 and the second direction D2).

At this time, the length L1 in the first direction D1 of the second optical system P2 may be equal to the distance L0 in the first direction D1 between the center of the rear surface Wb of the window W and the front surface M1f of the first mirror M1. In other words, the length L1 of the second optical system P2 in the first direction D1 may be less than that described with reference to FIG. 1.

FIGS. 7, 8A, 8B, 8C, and 8D are simulation results for explaining an image measured by a hyperspectral sensor according to embodiments of the inventive concept. FIG. 7 is an exemplary image taken by the first image sensor S1 (see FIG. 1), and FIGS. 8A to 8D are exemplary images captured by the second image sensor S2 (see FIG. 1).

FIG. 7 illustrates images of a plurality of elliptical shapes positioned on a plane parallel to the second direction D2 and the third direction D3 and perpendicular to the first direction D1. The plurality of elliptical shapes may be spaced apart from each other. The plurality of elliptical shapes may have different wavelength spectra.

FIGS. 8A to 8D are spectral images corresponding to the first scan area 10, the second scan area 20, the third scan area 30, and the fourth scan area 40 of FIG. 7. The first mirror M1 of FIG. 1 may rotate in order to capture spectral images of each of the first to fourth scan areas 10, 20, 30, and 40. In other words, when a spectrum image of each of the first to fourth scan areas 10, 20, 30, and 40 is taken, the angle at which the first mirror M1 of FIG. 1 is inclined may be different from each other.

Figure 9:
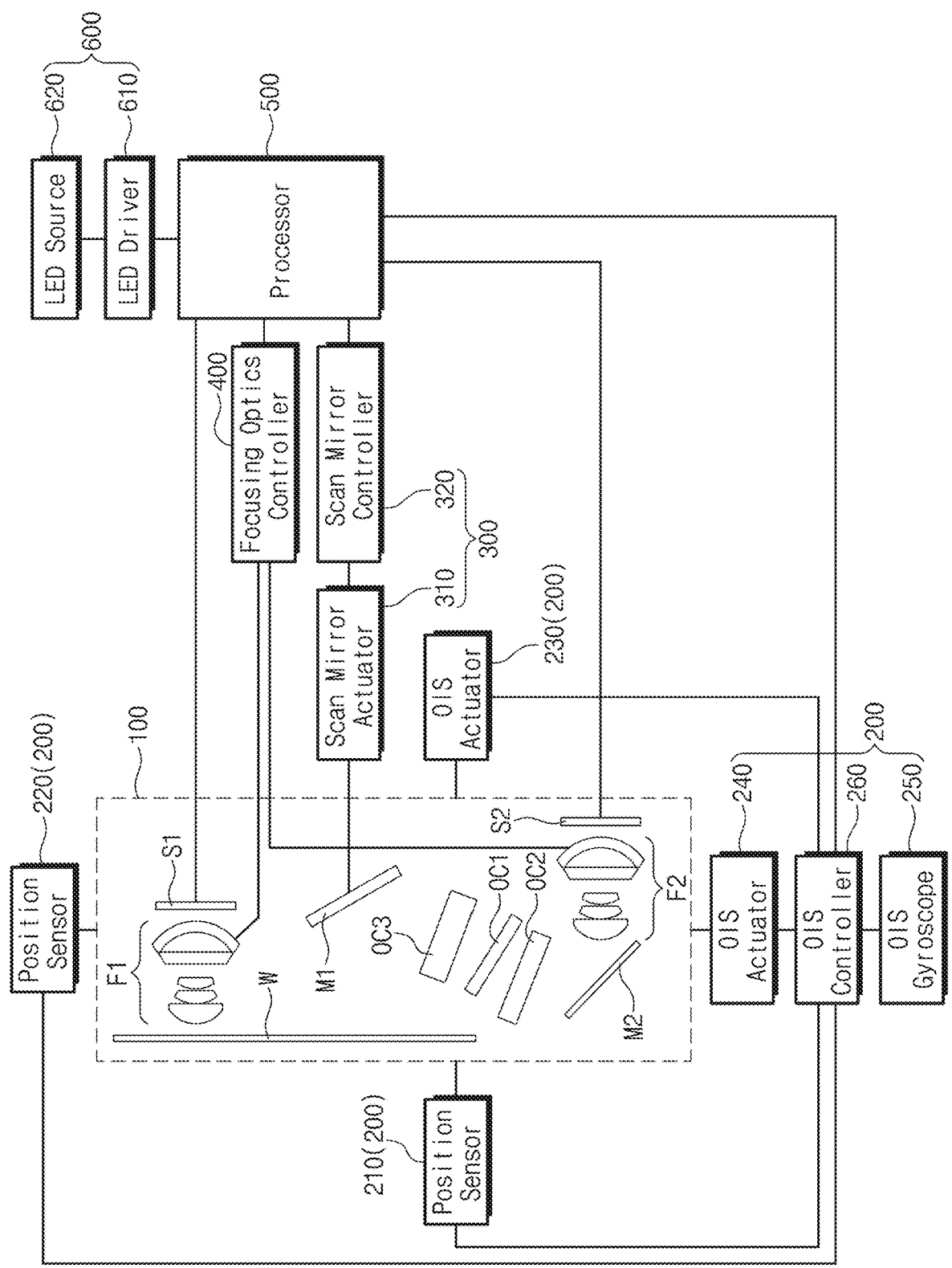
FIG. 9 is a conceptual diagram illustrating a hyperspectral imaging system including a hyperspectral sensor according to embodiments of the inventive concept.

FIG. 9 is a conceptual diagram illustrating a hyperspectral imaging system including a hyperspectral sensor according to embodiments of the inventive concept.

Referring to FIG. 9, the hyperspectral imaging system according to the inventive concept may include the hyperspectral sensor 100 described with reference to FIG. 1, an OIS module 200, a scan mirror controller 300, a focusing optics controller 400, a processor 500, and a light source controller 600.

The OIS module 200 may include first and second position sensors 210 and 220, first and second optical image stabilization (OIS) actuators 230 and 240, an OIS gyroscope 250, and an OIS controller 260. The first and second position sensors 210 and 220 may detect movement of the hyperspectral sensor 100 in the second direction D2 (see FIG. 1) and the third direction D3 (see FIG. 1). The first and second OIS actuators 230 and 240 may suppress the movement of the hyperspectral sensor 100. The OIS controller 260 may receive the position information of the first and second position sensors 210 and 220 and transmit the position information to the first and second OIS actuators 230 and 240. The OIS gyroscope 250 may be connected to the OIS controller 260. The OIS controller 260 may receive rotation information of the OIS gyroscope 250 and transmit the rotation information to the first and second OIS actuators 230 and 240. The OIS module 200 may prevent and/or minimize the movement of the hyperspectral sensor 100 due to vibration or the like.

The scan mirror controller 300 may include a scan mirror actuator 310 and a scan mirror controller 320. The scan mirror actuator 310 may be connected to the first mirror M1 of the hyperspectral sensor 100 and may rotate the first mirror M1. The scan mirror controller 320 may control the rotational movement of the first mirror M1 through the scan mirror actuator 310.

The focusing optics controller 400 may be connected to the first and second focusing parts F1 and F2 of the hyperspectral sensor 100. The focusing optics controller 400 may control a focal length of each of the first and second focusing parts F1 and F2.

The processor 500 may be connected to the first and second image sensors S1 and S2 of the hyperspectral sensor 100, the OIS module 200, the scan mirror controller 300, and the focusing optics controller 400, and may control their overall operations. The processor 500 may be, for example, a general-purpose processor or an application processor (AP).

The light source controller 600 may be connected to the processor 500. The light source controller 600 may include an LED driver 610 and an LED source 620. When using the LED source 620 whose spectrum is known in advance, a reflectance for each wavelength of an analysis target from the measured hyperspectral image may be calculated. According to embodiments, the light source controller 600 may be provided as an independent module outside the hyperspectral imaging system when the volume is large.

Figure 10:
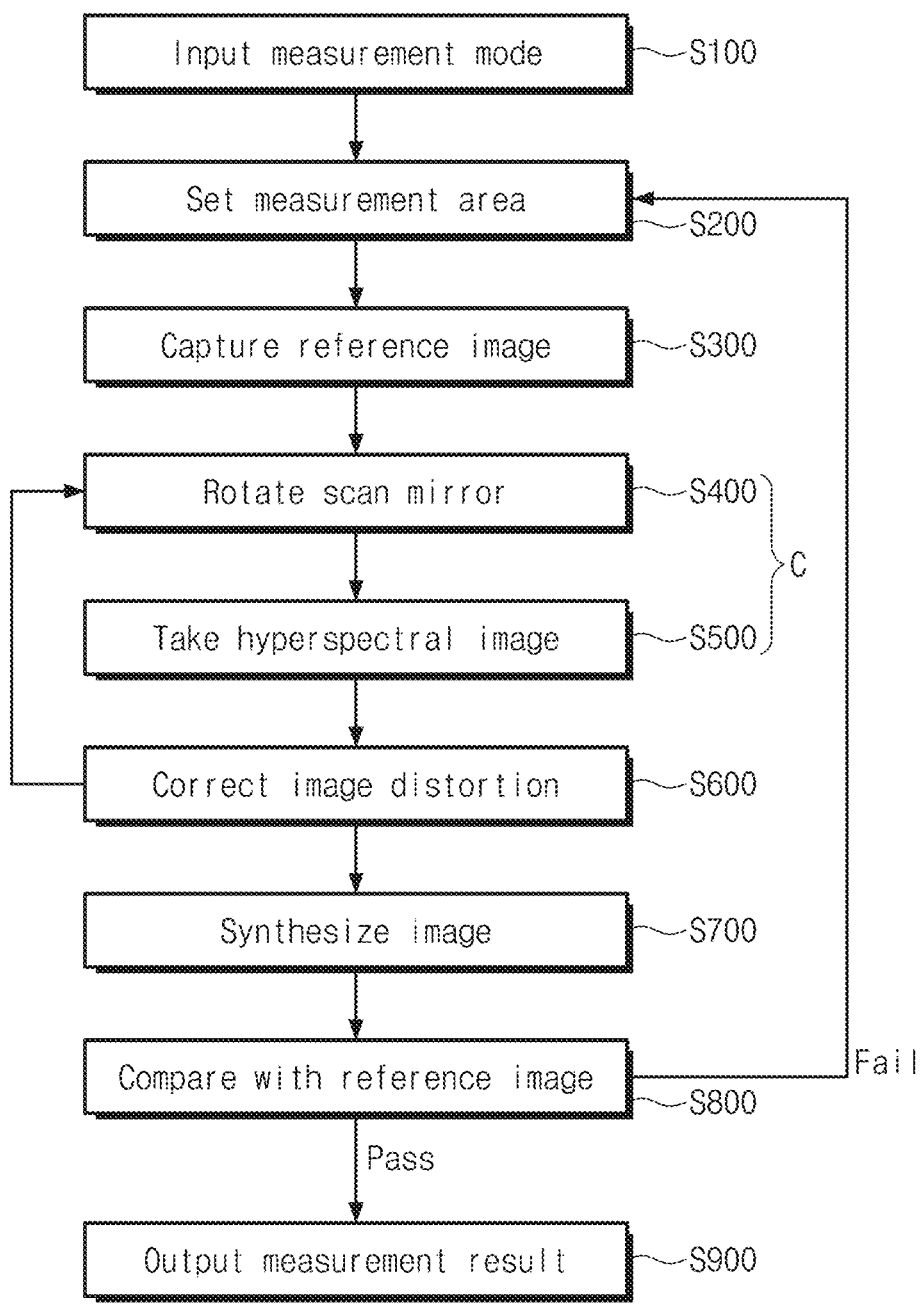
FIG. 10 is a flowchart illustrating a hyperspectral imaging method using a hyperspectral imaging system according to embodiments of the inventive concept.
Figure 11:
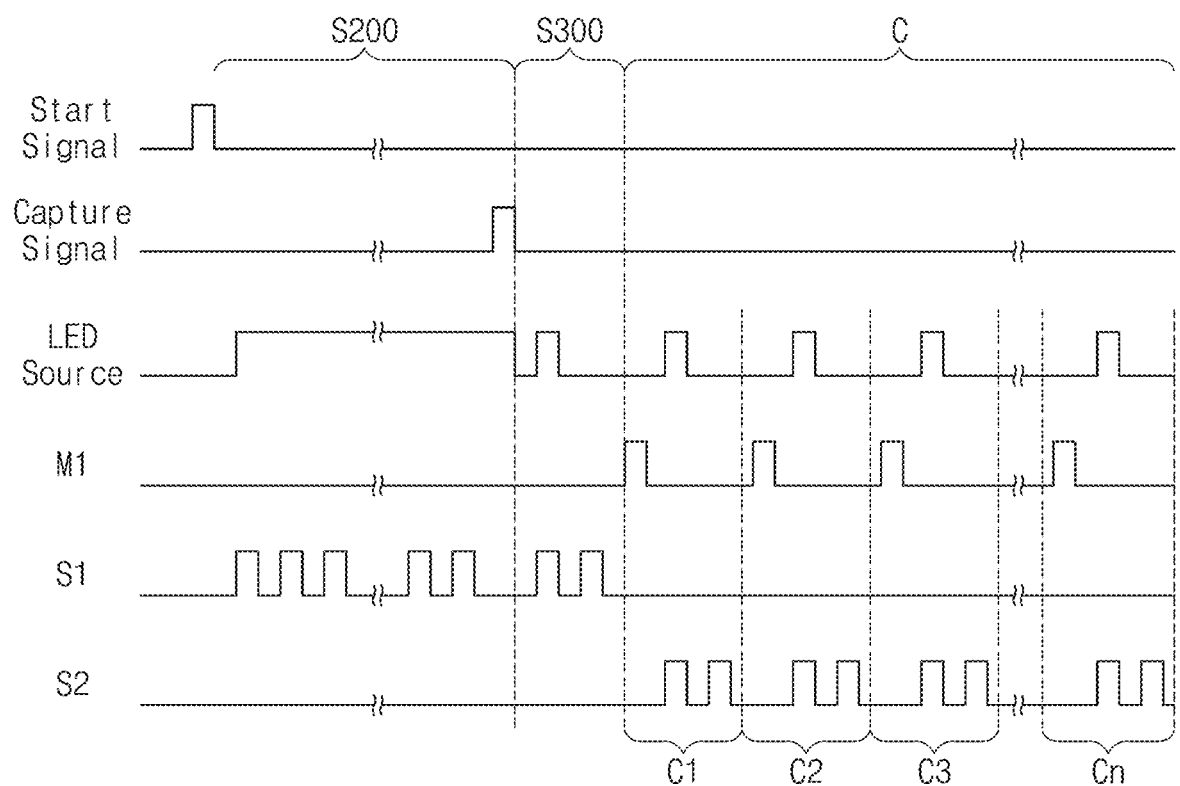
FIG. 11 is a timing diagram for explaining a hyperspectral imaging method using a hyperspectral imaging system according to embodiments of the inventive concept.

FIG. 10 is a flowchart illustrating a hyperspectral imaging method using a hyperspectral imaging system according to embodiments of the inventive concept. FIG. 11 is a timing diagram for explaining a hyperspectral imaging method using a hyperspectral imaging system according to embodiments of the inventive concept.

Referring to FIGS. 9, 10 and 11, the hyperspectral imaging method may include entering the measurement mode in operation S100, setting the measurement area in operation S200, taking a reference image in operation S300, rotating the scan mirror in operation S400, taking a hyperspectral image in operation S500, correcting the distortion of the hyperspectral image in operation S600, synthesizing the image in operation S700, comparing the reference image and the composite image in operation S800, and outputting the measurement result in operation S900.

Entering the measurement mode in operation S100 may include preparing the hyperspectral sensor 100 and determining an execution direction of software for driving the hyperspectral sensor 100 through a measurement mode desired by the user. The measurement mode may be, for example, any one selected from a point spectrum measurement mode, a spectrum measurement mode after shape recognition, a spatial low-resolution measurement mode, or a spatial high-resolution measurement mode.

The point spectrum measurement mode is a method of measuring only the spectrum of any one point in the image of the first image sensor S1. The point spectrum measurement mode has a much faster measurement speed and less data than other modes.

The spectrum measurement mode after shape recognition is a method of measuring the spectrum inside the boundary region after analyzing the boundary of the image of the first image sensor S1 by image processing. The spectrum measurement mode after shape recognition is useful for spectrum analysis of objects with relatively clear boundaries, such as grains and pills.

The spatial low-resolution measurement mode is a method using a pixel binning method of combining data from pixels of the second image sensor S2 arranged along one direction (the second direction D2 in FIG. 1). The spatial low-resolution measurement mode has a larger signal-to-noise ratio and shorter readout time than other modes, so the effect of motion blur is less and the measurement time is shorter. On the other hand, the spatial high-resolution measurement mode uses less pixel binning methods than the spatial low-resolution measurement mode, and has higher spatial resolution than other measurement modes.

Entering the measurement mode in operation S100 may further include adjusting the focal length of the first focusing part F1 through the focusing optics controller 400 of the hyperspectral sensor 100 according to the distance to the analysis target. When the analysis target is relatively close, the focal length of the first focusing part F1 may be adjusted to match the focal length of the third optical element OC3, and when the analysis target is relatively far away, the focal length of the first focusing part F1 may be adjusted to approach infinity. In addition, inputting the measurement mode in operation S100 may further include determining whether to dispose the third optical element OC3, a type of light source, and whether to use a pixel binning method. Setting the measurement area in operation S200 may be performed after a predetermined start signal. Setting the measurement area in operation S200 proceeds as follows. First, in a state in which the LED source 620 is turned on, the first image sensor S1 repeatedly captures an image and displays the captured image on the display. The hyperspectral sensor 100 is moved to focus based on the image displayed on the display (i.e., the analysis target is positioned at the focal length of the third optical element OC3). Then, a measurement area is selected from the image shown on the display. In point spectrum measurement mode, selecting a measurement area is selecting a point in the image shown on the display. In other measurement modes, selecting the measurement area may be determining the size and position of a rectangle including a partial area of the image shown on the display.

The rotation angle interval of the first mirror M1, the number of scans, and the like may be calculated according to the set measurement area, and the calculated result may be stored in a memory. For example, in the point spectrum measurement mode, the rotation angle of a selected point may be calculated and stored, and in the spectrum measurement mode after shape recognition, the rotation angle of each of the internal points of the plurality of recognized regions may be calculated and stored.

According to setting the measurement area in operation S200 before taking the hyperspectral image in operation S500, the scan area may be minimized, and the problem that it takes a long time to scan the entire area when the exposure time is long may be solved.

Taking the reference image in operation S300 is performed once in a state in which the LED source 620 is turned on, and is performed once in a state in which the LED source 620 is turned off, by the first image sensor S1. By subtracting an image taken in a state in which the LED source 620 is turned off from an image taken in a state in which the LED source 620 is turned on, the influence of ambient light may be removed.

A photographing operation C including rotating the scan mirror in operation S400, taking the hyperspectral image in operation S500, and correcting the distortion of the hyperspectral image in operation S600 may be repeated n times while rotating the first mirror M1 at an angle at a predetermined interval. The number of repetitions n of the photographing operation may be determined using information stored in the memory calculated by setting the measurement area in operation S200.

The photographing operation C may include a first photographing operation C1, a second photographing operation C2, a third photographing operation C3 to an n-th photographing operation Cn. after rotating the first mirror M1, Each of the first photographing operation C1, the second photographing operation C2, the third photographing operation C3 to the n-th photographing operation Cn is performed once in a state in which the LED source 620 is turned on and is performed once in a state in which the LED source 620 is turned off by the second image sensor S2.

Comparing the reference image and the composite image in operation S800 may be determining whether a normalized cross-correlation (NCC) value of the composite image and the reference image exceeds a predetermined threshold value. If the normalized correlation value of the composite image and the reference image does not exceed the threshold value (i.e., fail), the process may return to setting the measurement area in operation S200. By comparing the reference image and the composite image in operation S800, the reliability of the hyperspectral imaging method according to the inventive concept may be improved.

The hyperspectral sensor according to an embodiment of the inventive concept may filter incident light through volume Bragg grating, so that the sensor may be miniaturized, simplified, and easy to fabricate and align.

In addition, the hyperspectral imaging system and the hyperspectral imaging method using the same according to an embodiment of the inventive concept may minimize the scan area, so that if the exposure time is long, the problem that it takes a long time to scan the entire area may be solved.

In addition, in the hyperspectral imaging method according to an embodiment of the inventive concept, reliability may be improved by comparing the reference image photographed by the first image sensor with the hyperspectral image photographed by the second image sensor.

Although the embodiments of the inventive concept have been described, it is understood that the inventive concept should not be limited to these embodiments but various changes and modifications may be made by one ordinary skilled in the art within the spirit and scope of the inventive concept as hereinafter claimed.

What is claimed is:

1. A hyperspectral sensor comprising:
    a window;
    a first focusing part provided on a rear surface of the window and including a plurality of lenses;
    a first image sensor provided on a rear surface of the first focusing part and having a front surface parallel to the rear surface of the window;
    a first mirror spaced apart from the first focusing part and the first image sensor and having a front surface inclined with respect to the rear surface of the window;
    a first optical element spaced apart from the first mirror;
    a second optical element spaced apart from the first optical element and having a periodic refractive index distribution therein;
    a second focusing part spaced apart from the second optical element and including a plurality of lenses; and
    a second image sensor provided on a rear surface of the second focusing part;
    wherein the first mirror is connected to an actuator, and
    wherein the first mirror is configured to be rotated by the actuator.

2. The hyperspectral sensor of claim 1, wherein the first optical element has a periodic refractive index distribution therein,
    wherein a thickness of the first optical element is less than a thickness of the second optical element.

3. The hyperspectral sensor of claim 1, wherein the first optical element is any one or a combination of two or more selected from surface diffraction grating, volume Bragg grating, or at least one or more prisms.

4. The hyperspectral sensor of claim 1, wherein the second optical element is configured such that light diffracted by the second optical element travels in parallel with the rear surface of the window.

5. The hyperspectral sensor of claim 1, wherein the front surface of the first mirror is a curved surface having a curvature.

6. The hyperspectral sensor of claim 1, further comprising a third optical element between the first mirror and the first optical element,
    wherein the third optical element is a close-up lens or an achromatic lens.

7. The hyperspectral sensor of claim 1, further comprising a second mirror spaced apart from the second optical element and the second focusing part and having a front surface inclined with respect to the rear surface of the window, wherein the second image sensor has a front surface parallel to the rear surface of the window.

8. The hyperspectral sensor of claim 1, wherein the second image sensor extends in a direction perpendicular to the rear surface of the window.

9. The hyperspectral sensor of claim 1, further comprising a first shade adjacent to the front surface of the first mirror, and a second shade adjacent to a rear surface of the second optical element,
wherein each of the first and second shades is configured to remove a 0th-order diffracted light component that is not diffracted from the second optical element.

10. A hyperspectral imaging system comprising:
a hyperspectral sensor including a window, a first optical system configured to receive a first incident light, and a second optical system spaced apart from the first optical system and configured to receive a second incident light;
an optical image stabilization (OIS) module configured to detect and control the movement of the hyperspectral sensor; and
a processor connected to the first optical system and the second optical system of the hyperspectral sensor, and the OIS module,
wherein the first optical system comprises:
a first focusing part provided on a rear surface of the window and configured to focus the first incident light; and
a first image sensor provided on a rear surface of the first focusing part and configured to detect the first incident light passing through the first focusing part,
wherein the second optical system comprises:
a first mirror having a front surface inclined with respect to the rear surface of the window and configured to reflect the second incident light;
first and second optical elements spaced apart from the first mirror and configured to diffract the second incident light;
a second focusing part spaced apart from the second optical element and configured to focus diffracted light diffracted by the second optical element; and
a second image sensor provided on a rear surface of the second focusing part and configured to detect the diffracted light passing through the second focusing part;
wherein each of the first and second optical elements is a volume Bragg grating, and
wherein a grating period of the first optical element is different from a grating period of the second optical element.

11. The hyperspectral imaging system of claim 10, wherein the first optical element is any one or a combination of two or more selected from surface diffraction grating, volume Bragg grating, or at least one or more prisms,
wherein the second optical element is a volume Bragg grating.

12. The hyperspectral imaging system of claim 10, wherein the OIS module comprises position sensors and OIS actuators connected to the hyperspectral sensor, and an OIS controller connected to the position sensors and the OIS actuators, respectively,
wherein the OIS controller is configured to receive position information from the position sensors and transmit the position information to the OIS actuators.

13. The hyperspectral imaging system of claim 10, further comprising:

a scan mirror controller connected to the first mirror of the second optical system;
a focusing optics controller connected to the first focusing part of the first optical system and the second focusing part of the second optical system; and
a light source controller connected to the processor,
wherein the light source controller comprises an LED driver connected to the processor, and an LED source connected to the LED driver and having a predetermined spectrum.

14. A hyperspectral imaging method using a hyperspectral sensor including a window configured such that first and second incident lights are incident, a first optical system configured such that the first incident light passing through the window is incident; and a second optical system spaced apart from the first optical system and configured such that the second incident light passing through the window is incident, the method comprising:
setting a measurement area;
taking a reference image by the first optical system;
taking hyperspectral images by the second optical system;
compositing the hyperspectral images;
comparing the reference image with a composite image obtained by compositing the hyperspectral images; and
outputting a measurement result,
wherein the first optical system comprises:
a first focusing part provided on a rear surface of the window and configured to focus the first incident light; and
a first image sensor provided on a rear surface of the first focusing part and configured to detect the first incident light passing through the first focusing part,
wherein the second optical system comprises:
a first mirror having a front surface inclined with respect to the rear surface of the window and configured to reflect the second incident light;
a spectral angle converting unit spaced apart from the first mirror and configured to convert the second incident light to travel at an angle that satisfies a Bragg condition for each wavelength;
a volume Bragg grating spaced apart from the spectral angle converting unit and configured to diffract the angle-converted light by the spectral angle converting unit;
a second focusing part spaced apart from the volume Bragg grating and configured to focus diffracted light diffracted by the volume Bragg grating; and
a second image sensor provided on a rear surface of the second focusing part and configured to detect the diffracted light passing through the second focusing part.

15. The method of claim 14, wherein the taking of the hyperspectral images by the second optical system comprises a plurality of photographing operations,
wherein each of the photographing operations comprises:
rotating the first mirror;
taking a hyperspectral image by the second image sensor; and
correcting a distortion of the hyperspectral image.

16. The method of claim 15, wherein the taking of the hyperspectral image by the second image sensor is performed once with a light source on and is performed once with the light source off.

17. The method of claim 14, further comprising inputting a measurement mode before the setting of the measurement area, wherein the measurement mode is any one selected from a point spectrum measurement mode, a spectrum measurement mode after shape recognition, a spatial low-resolution measurement mode, or a spatial high-resolution measurement mode.

18. The method of claim 14, wherein the spectral angle converting unit is any one or a combination of two or more selected from surface diffraction grating, volume Bragg grating, or one or more prisms.

* * * * *